US011537372B2

(12) United States Patent
Toper

(10) Patent No.: US 11,537,372 B2
(45) Date of Patent: Dec. 27, 2022

(54) GENERATING COMPILABLE MACHINE CODE PROGRAMS FROM DYNAMIC LANGUAGE CODE

(71) Applicant: Manycore Corporation, Paris (FR)

(72) Inventor: Nicolas Toper, Paris (FR)

(73) Assignee: Manycore Corporation, Paris (FR)

( * ) Notice: Subject to any disclaimer, the term of this patent is extended or adjusted under 35 U.S.C. 154(b) by 0 days.

(21) Appl. No.: 17/210,499

(22) Filed: Mar. 24, 2021

(65) Prior Publication Data
US 2021/0303283 A1 Sep. 30, 2021

Related U.S. Application Data

(60) Provisional application No. 62/994,763, filed on Mar. 25, 2020.

(51) Int. Cl.
*G06F 9/44* (2018.01)
*G06F 8/41* (2018.01)

(52) U.S. Cl.
CPC .................... *G06F 8/443* (2013.01)

(58) Field of Classification Search
CPC ........................................ G06F 8/443
USPC ........................................ 717/151
See application file for complete search history.

(56) References Cited

U.S. PATENT DOCUMENTS

| | | | |
|---|---|---|---|
| 8,522,220 B2* | 8/2013 | Shih-wei Liao | G06F 8/4442 717/146 |
| 9,128,732 B2* | 9/2015 | Hunt | G06F 9/45516 |
| 9,182,955 B1* | 11/2015 | He | G06F 8/4435 |
| 9,367,307 B2* | 6/2016 | Allen | G06F 8/443 |
| 9,405,517 B2* | 8/2016 | Schmidt | G06F 8/41 |
| 9,442,707 B2* | 9/2016 | Sathyanathan | G06F 8/41 |
| 9,658,839 B2* | 5/2017 | Hale | G06F 8/443 |
| 9,940,109 B2* | 4/2018 | Esliger | G06F 8/71 |

(Continued)

FOREIGN PATENT DOCUMENTS

WO WO-2015188026 A1 * 12/2015 ............. G06F 8/433

OTHER PUBLICATIONS

Zhifei Chen et al. "Dynamic Slicing of Python Programs"; 2014 IEEE 38th Annual International Computers, Software and Applications Conference—2014 IEEE.*

(Continued)

*Primary Examiner* — Francisco J Aponte
(74) *Attorney, Agent, or Firm* — Cognition IP, P.C.; Edward Steakley; Aroon Karuna

(57) ABSTRACT

Methods and systems describe providing a compilable machine code program from dynamic language code. First, the system receives a computer program consisting of code in a dynamic language. For each dynamic instruction within the code, the system: identifies all function calls within the code which may call the dynamic instruction; generates a super slice callgraph for all identified function calls for the dynamic instruction, including dependency relationships for instance variables and static variables within time constraints; and generates a set of slices for the dynamic instruction. The system then compiles and executes each slice to identify one or more values for each dynamic instruction. Next, the system updates the computer program such that each of at least a subset of the dynamic instructions is replaced with machine code instructions based on the corresponding values.

16 Claims, 9 Drawing Sheets

(56) References Cited

U.S. PATENT DOCUMENTS

| | | | | |
|---|---|---|---|---|
| 10,013,243 | B2* | 7/2018 | Abadi | G06F 11/3628 |
| 10,223,141 | B2* | 3/2019 | Mars | G06F 8/443 |
| 10,261,765 | B1* | 4/2019 | Prokopec | G06F 8/443 |
| 10,324,741 | B2* | 6/2019 | Westrelin | G06F 9/4552 |
| 10,372,582 | B2* | 8/2019 | Guarnieri | G06F 8/434 |
| 10,466,988 | B2* | 11/2019 | Toper | G06F 8/456 |
| 10,871,950 | B2* | 12/2020 | De Smet | G06F 16/9024 |
| 2011/0138373 | A1* | 6/2011 | Lane | G06F 8/443 |
| | | | | 717/157 |
| 2015/0220314 | A1* | 8/2015 | Divekar | G06F 8/458 |
| | | | | 717/157 |
| 2016/0170725 | A1* | 6/2016 | Holton | G06F 8/451 |
| | | | | 717/157 |
| 2018/0107465 | A1* | 4/2018 | Silbermintz | G06F 8/447 |
| 2018/0364994 | A1* | 12/2018 | Toper | G06F 8/433 |
| 2020/0210161 | A1* | 7/2020 | Portela Parente | G06F 16/9024 |
| 2021/0303283 | A1* | 9/2021 | Toper | G06F 8/4441 |
| 2021/0373862 | A1* | 12/2021 | Thoemmes | G06F 8/433 |
| 2022/0164170 | A1* | 5/2022 | Benton | G06F 8/433 |
| 2022/0188084 | A1* | 6/2022 | Goswami | G06F 8/433 |

OTHER PUBLICATIONS

Yun Lin et al. "Break the Dead End of Dynamic Slicing: Localizing Data and Control Omission Bug"; Proceedings of the 2018 33rd ACM/IEEE International Conference on Automated Software Engineering (ASE '18), Sep. 3-7, 2018.*

Andrei Rimsa et al. "Practical dynamic reconstruction of control flow graphs"; Software Practice and Experience—vol. 51, pp. 353-384—Oct. 11, 2020.*

* cited by examiner

GENERATING COMPILABLE MACHINE CODE PROGRAMS FROM DYNAMIC LANGUAGE CODE

CROSS-REFERENCE TO RELATED APPLICATIONS

This application claims the benefit of U.S. Provisional Application No. 62/994,763, filed Mar. 25, 2020, which is hereby incorporated by reference in its entirety. This application is related to U.S. Pat. No. 10,466,988 B2, issued on Nov. 5, 2019, entitled "SYSTEMS AND METHODS FOR AUTOMATIC COMPUTER CODE PARALLELIZATION, which is hereby incorporated by reference.

FIELD OF THE INVENTION

The present invention relates generally to computer science, and more particularly, to methods and apparatuses for generating a compiled program from a dynamic language program.

BACKGROUND

Within the field of computer science, a major topic of discussion and debate revolves around the merits of dynamic languages and static languages. Many programmers and developers prefer to write computer programs in dynamic languages, such as Python, Ruby, and PHP. Dynamic languages can be altered at runtime, and have flexibility in how a program should be executed at runtime. In contrast to a static or non-dynamic language, these dynamic runtime instructions can be defined by the program itself. While this is powerful and flexible, a major downside is that the usage of dynamic instructions is often very slow.

One example is the use of reflection instructions in Java. Reflection instructions are dynamic instructions defined in an API which is used to examine or modify the behavior of methods, classes, and interfaces at runtime. Reflection gives information about the class to which an object belongs, as well as the methods of that class which can be executed by using the object. Through reflection, methods can be invoked at runtime as long as the name and parameter types of the method are known. This allows the program to be built at runtime.

While reflection is useful for a number of reasons within Java, it has been empirically demonstrated that it can be up to 1,000 times slower than a similar program using direct code. This is due to existing Java interpreters not being able to optimize around the reflection instructions in an adequate way.

Just-In-Time (JIT) compilation optimizations can sometimes work to at least partly mitigate this problem. For example, when used in a program, reflection instructions may be potentially used in hundreds of thousands of different contexts. If one programmatically determines that there are 500 possible contexts on which the usage may turn, and puts the instructions in the program directly, then this "code specialization" can result in benefits. Bounded formal logic can also be used for some optimization. For example, if there is a dynamic instruction which iterates on a list, formal logic may be applied to reason that this list will only have a certain number of elements, and will never jump from 500 elements to 10,000 elements. As a result, optimization can be achieved by building a program around the assumption that the list will have a specific fixed number of elements. This method involves adding constraints to the program based on what can be deduced from the program. While these lead to optimizations, they are not large enough to make a significantly meaningful impact on speed to mitigate the often drastic slowdown caused by invoking dynamic instructions. One problem with this approach is that it is focused on reasoning about the program in the abstract, and attempting to prove formal logic in order to add constraints for optimization, but it fails to actually work directly with the program, including actual execution of the program in order to gain insights and add constraints.

In computer science, partial evaluation is a technique for program optimization by specialization in respect to either static or dynamic inputs. A computer program prog is seen as a mapping of input data into output data:

$$prog: I_{static} \times I_{dynamic} \to O,$$

where $I_{static}$, the static data, is the part of the input data known at compile time. The partial evaluator transforms $$\langle prog, I_{static} \rangle$$
$$\text{into}$$
$$prog^*: I_{dynamic} \to O$$

by precomputing all static input at compile time. prog* is called the "residual program" and should run more efficiently than the original program. The act of partial evaluation results in "residual" code, or code left over after evaluating parts of the expression.

Supercompilation is a program optimization technique that can be approached as a generalization of partial evaluation. The idea behind partial evaluation is that many parts of a program can be evaluated at the time of compiling. Supercompilation extends this, evaluating things that can't be fully done at compile time by deferring some computation while maintaining the evaluation. Partial evaluation and supercompilation are general parts of metacompilation, which involves metasystems.

The versioned dependency graph (VDG), when implemented, enables high compute efficiencies of the program analysis when compared to traditional solutions of system dependency or program dependency graphs. A versioned dependency graph may function to identify code instructions and map the code instructions. The versioned dependency graph may indicate the threadbility of a group or list of instructions by identifying a threading weight, or a threading score associated with a group or list of instructions within the versioned dependency graph. The threading strategy derived from the versioned dependency graph enables parallelization of one or more disparate blocks of code.

In computer programming, program slicing or "slicing" is a method used by programmers for abstracting from programs. The present invention allows for slices to be executable, whereas traditional slices are not. Program slicing is the computation of the set of program statements, the "program slice," that may affect values at some point of interest in the program. A static program slice S consists of all statements in program P that may affect the value of variable v in a statement x. The slice is defined for a seed C=(x,v) where x is a statement in program P and v is variable in x. A static slice includes all the statements that can affect the value of variable vat statement x for any possible input at the point of interest. Static slices are computed by backtracking dependencies between statements. More specifically, to compute the static slice for (x,v), all statements that can directly affect the value of v must be found before statement x is encountered. Recursively, for each statement y which can affect the value of v in statement x, slices are computed for all variables z in y that affect the value of v. The union of all those slices is the slice group for (x,v). All slices disclosed herein are slice groups.

Thus, there is a need in the field of computer science to create a new and useful system and method for generating a compiled, optimized machine code program from dynamic language code to provide the benefits and flexibility of writing dynamic language code with the speed optimizations of static language compiled code. The source of the problem, as discovered by the inventors, is a lack of code optimization and conversion of dynamic instructions to static instructions based on insights gained from executing the program.

SUMMARY

One embodiment relates to providing a compilable machine code program from dynamic language code. The dynamic language code may be, e.g., source code, bytecode, or any other suitable code. First, the system receives a computer program consisting of code in a dynamic language. For each dynamic instruction within the code, the system: identifies all function calls within the code which may call the dynamic instruction; generates a super slice callgraph for the dynamic instruction, (super slice callgraph includes dependency relationships for instance variables and static variables within time constraints; and generates a set of slices for the dynamic instruction). The system then compiles and executes each slice to identify one or more values for each dynamic instruction. Next, the system updates the computer program such that each of at least a subset of the dynamic instructions is replaced with machine code instructions based on the corresponding values. In some embodiments, the system compiles the updated computer program. In some embodiments, the system sends this compiled computer program on to one or more systems or devices, or presents it within a user interface of a client device. In some embodiments, cloud compilation is performed. Because compilation can take a significant amount of compute time, such compilation can potentially be much faster using techniques such as parallelism.

In some embodiments, as part of the process of generating the slices, the system generates a versioned dependency graph (VDG) for the dynamic instruction. The system then transforms one or more static instructions from the dynamic instruction based on the VDG. The versioned dependency graph (VDG) reduces the complexity from an exponential complexity, to a logarithmic complexity. Therefore, the versioned dependency graph (VDG) enables high computational efficiencies of the program when compared to traditional solutions.

In one embodiment, there is a method, system and non-transitory computer-readable media for generating compilable machine code programs from dynamic language code. The system receives a computer program comprising code in a dynamic language, wherein the code comprises a plurality of dynamic instructions. For each dynamic instruction within the code, the system identifies all function calls within the code which may call the dynamic instruction, generates an super slice callgraph for the identified function calls. The super slice callgraph may be a callgraph of the identified function calls extended to include dependency relationships. For instance, there may be variables and static variables within time constraints. The dependency relationships may comprise read→write dependencies. The system generates a set of slices for the dynamic instruction. The system compiles and executes each super slice callgraph to identify one or more values for each dynamic instruction. The system updates the computer program such that each of at least a subset of the dynamic instructions is replaced with machine code instructions based on the corresponding values.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
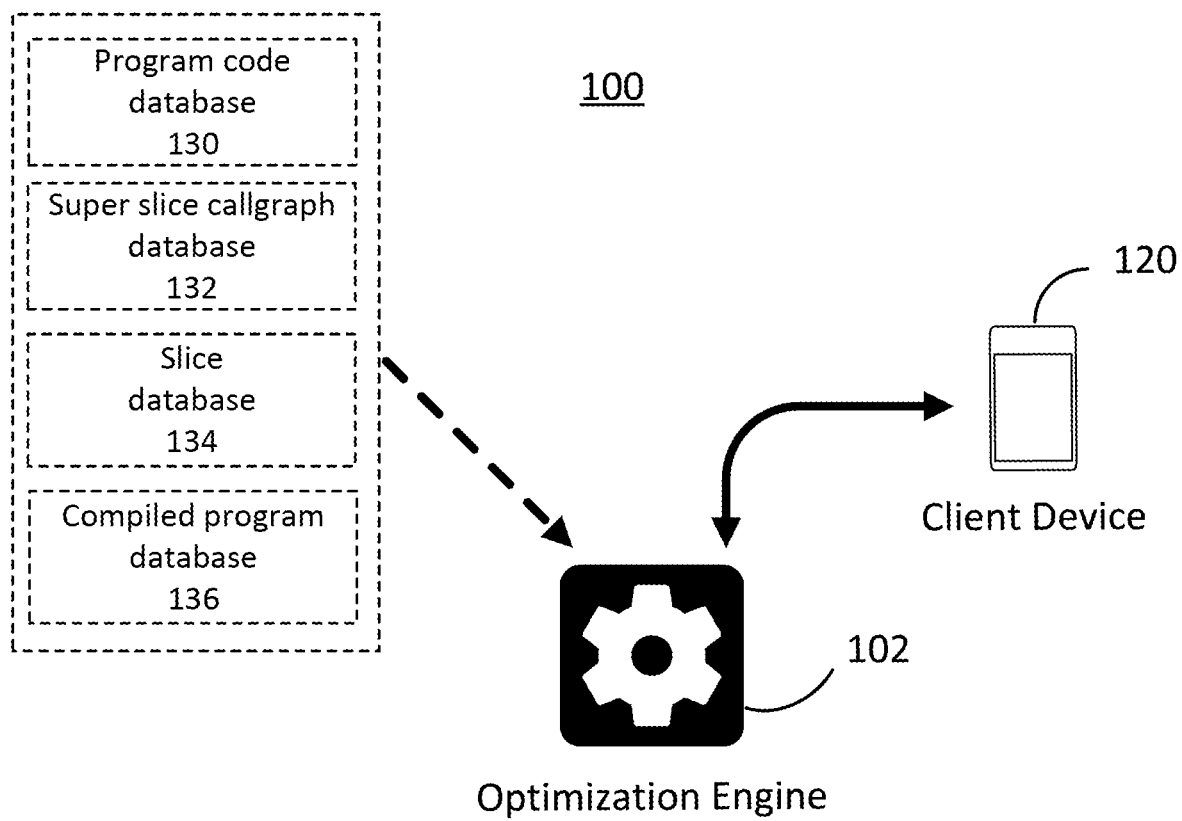
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a client device 120 is connected to an optimization engine 102. The optimization engine 102 is optionally connected to one or more optional database(s), including a program code database 130, super slice callgraph database 132, slice database 134, and/or compiled program database 136. One or more of the databases may be combined or split into multiple databases. The scanning device and client device in this environment may be computers.

The exemplary environment 100 is illustrated with only one client device and optimization engine for simplicity, though in practice there may be more or fewer client devices and/or optimization engines. In some embodiments, the client device and optimization engine may be part of the same computer or device.

In an embodiment, the optimization engine 102 may perform the method 200 or other method herein and, as a result, provide generation of a compilable machine code program from dynamic language code. In some embodiments, this may be accomplished via communication with the client device or other device(s) over a network between the client device 120 or other device(s) and an application server or some other network server. In some embodiments, the optimization engine 102 is an application hosted on a computer or similar device, or is itself a computer or similar device configured to host an application to perform some of the methods and embodiments herein.

Client device 120 is a device that sends and receives information to the optimization engine 102. In some embodiments, client device 120 is a computing device capable of hosting and executing one or more applications or other programs capable of sending and receiving information. In some embodiments, the client device 120 may be a computer desktop or laptop, mobile phone, virtual reality or augmented reality device, wearable, or any other suitable device capable of sending and receiving information. In some embodiments, the optimization engine 102 may be hosted in whole or in part as an application executed on the client device 120.

Optional database(s) including one or more of a program code database 130, super slice callgraph database 132, slice database 134, and/or compiled program database 136 function to store and/or maintain, respectively, code which is optimized by the optimization engine 102, super slice callgraphs generated or received as part of the optimization process, slices generated as part of the optimization process, and compiled programs generated from program code. The optional database(s) may also store and/or maintain any other suitable information for the optimization engine 102 to perform elements of the methods and systems herein. In some embodiments, the optional database(s) can be queried by one or more components of system 100 (e.g., by the optimization engine 102), and specific stored data in the database(s) can be retrieved.

Figure 1B:
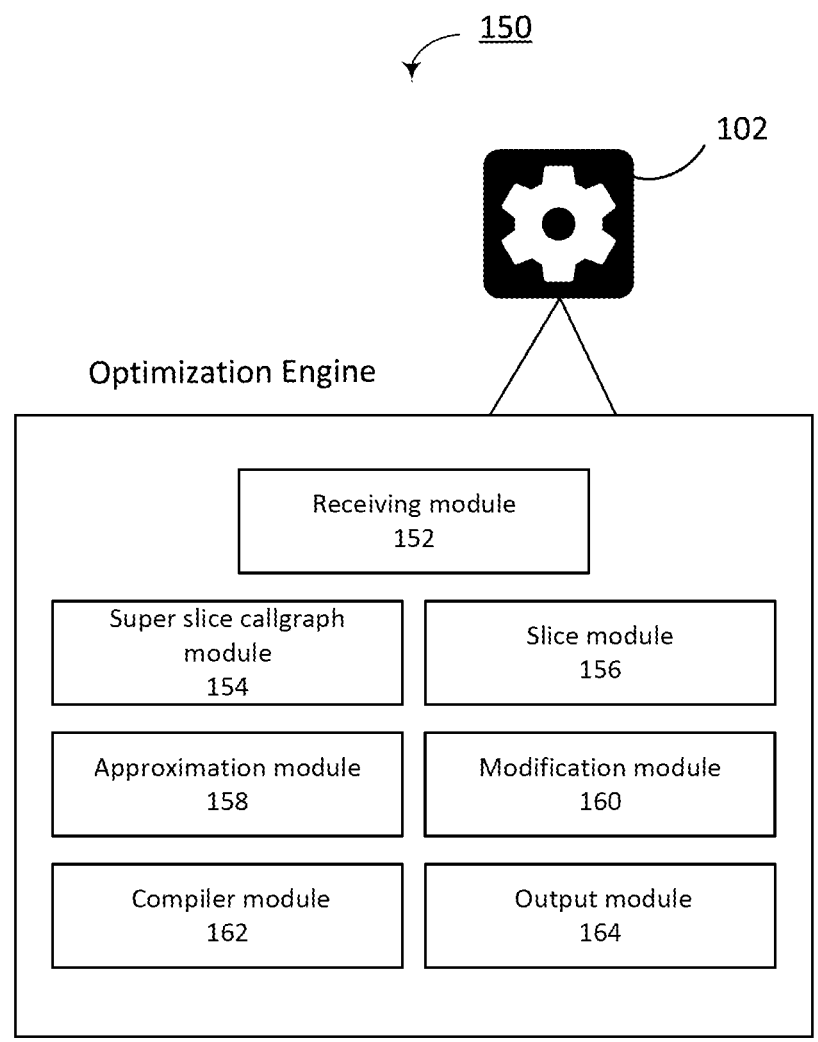
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Receiving module 152 functions to receive a computer program consisting of code. In some embodiments, the computer program consists of code (e.g., source code, machine code or bytecode) received from the client device 120 or some other device or system. In some embodiments, the code is written in a dynamic language. A "dynamic language" is a programming language where the executable code is generated at runtime (i.e., during execution). As such, a programmer using a dynamic language can decide how a program is to be executed at runtime to generate executable code. In some embodiments, the dynamic language may be, e.g., Java, Python, Ruby, PHP, or any other dynamic programming language.

Super slice callgraph module 154 functions to generate one or more super slice callgraphs based on the received program. A super slice callgraph is a callgraph of function calls (e.g., all function calls within a given dynamic instruction) extended to include dependency relationships comprising variables and static variables within time constraints. The dependency relationships may include read→write dependency relationships. Generation of super slice callgraphs will be described in further detail below.

Slice module 156 functions to generate a set of slices for a given dynamic instruction. The slices are generated by slice module 156 based on a generated super slice callgraph for the dynamic instruction. A slice is generated for each of the function calls that are identified by super slice callgraph module 154.

Approximation module 158 functions to compile and approximate execution of each generated slice. In some embodiments, the approximation module 158 is a dynamic-compilation machine capable of executing slices.

Modification module 160 functions to update the computer program such that each of at least a subset of the dynamic instructions is replaced with machine code instructions based on the corresponding values. In some embodiments, the modification module 160 compiles the updated computer program. In some embodiments, the modification module 160 sends this compiled computer program on to one or more systems or devices, or presents it within a user interface of a client device. In some embodiments, cloud compilation is performed. Because compilation can take a significant amount of compute time, such compilation can potentially be much faster using techniques such as parallelism.

Compiler module 162 functions to compile the updated computer program. In some embodiments, the compiler is a static-compilation-based compiler or machine capable of compiling and approximating execution of the computer program based on machine code. In some embodiments, the compiler module 162 sends this compiled computer program on to one or more systems or devices, or presents it within a user interface of a client device. In some embodiments, cloud compilation is performed. Because compilation can take a significant amount of compute time, such compilation can potentially be much faster using techniques such as parallelism.

Output module 164 functions to send the updated computer program to one or more devices or systems. In some embodiments, output module 164 sends the updated computer program to client device 120, compiled program database 136, or some other element of the system. In some embodiments, output module 164 sends the updated computer program to one or more external devices via communication with one or more networks and/or servers. In some embodiments, output module 164 functions to display one or more output elements within a user interface of client device 120 or some other device or system. Displayed elements may include, for example, the optimized code within the updated computer program after modifications, information about the optimizations performed, one or more super slice callgraphs or sub-super slice callgraphs, an environment to perform further approximation of executions of the computer program, one or more metric (e.g., number of dynamic instructions in the computer program, number of dynamic instructions replaced with static instructions, number of total optimizations performed, estimated, approximated, or actual compilation and/or execution time), or any other suitable elements related to the systems and methods herein.

Figure 1C:
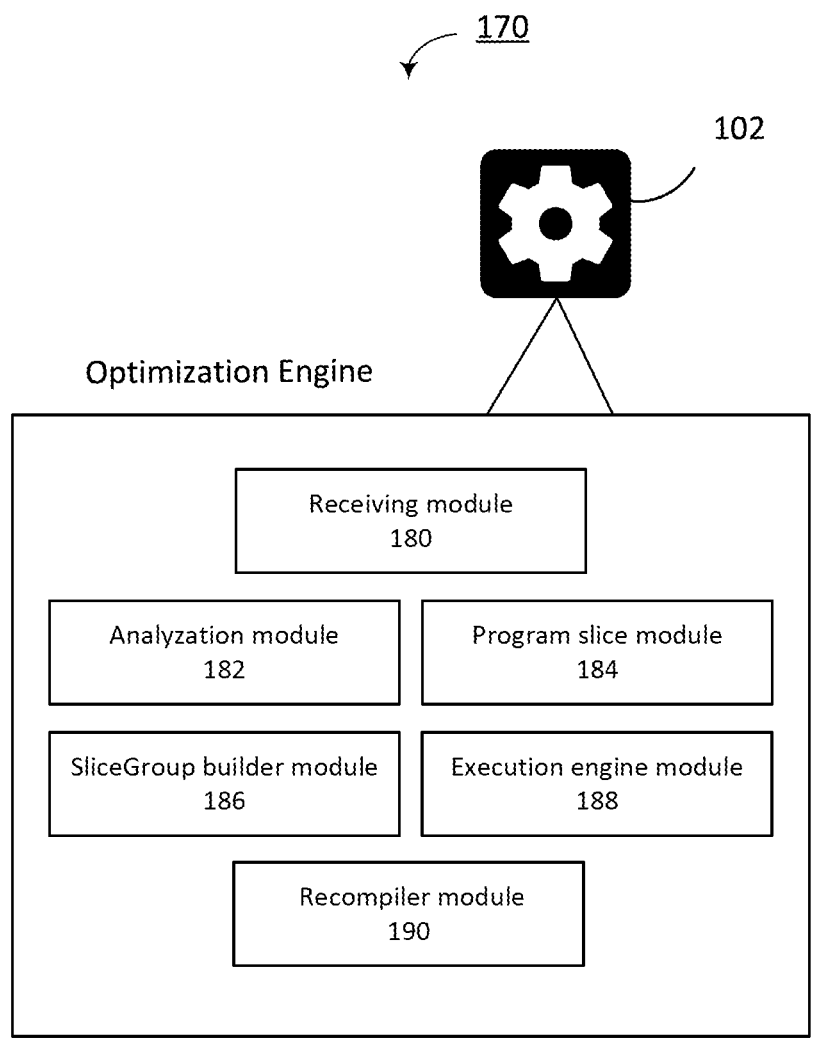
FIG. 1C is a diagram illustrating an exemplary computer system that may execute instructions to perform some of the methods herein.

FIG. 1C is a diagram illustrating an exemplary computer system 170 with software modules that may execute some of the functionality described herein.

Receiving module 180 functions to receive a computer program consisting of code. In some embodiments, the computer program consists of code (e.g., source code, machine code or bytecode) received from the client device 120 or some other device or system. In some embodiments, the code is written in a dynamic language. A "dynamic language" is a programming language where the executable code is generated at runtime (i.e. during execution). As such, a programmer using a dynamic language can decide how a program is to be executed at runtime to generate executable code. In some embodiments, the dynamic language may be, e.g., Java, Python, Ruby, PHP, or any other dynamic programming language.

Analyzation module 182 functions to compile and analyze the computer program. In some embodiments, the analyzation module 182 creates a versioned dependency graph (VDG).

Program slice module 184 functions to generate a set of slices based on the received program for a given dynamic instruction. A set of slices are extended to include dependency relationships comprising variables and static variables within time constraints.

SliceGroup builder module 186 functions to generate a set of slices based on the received program and handle method/function calls, static and instance variables. Static variables are variables initialized only once, at the start of execution. Instance variables are created when an object is instantiated, and may be accessible to all constructors, methods, or blocks in the class.

Execution engine module 188 functions to execute the generated slices from the program slice module 184 and SliceGroup builder module 186. The execution engine 188 executes the generated slices to capture values of the slices.

Recompiler module 190 functions to recompile slices that have been partially evaluated. Once the slices have been evaluated, code generated from the slices are replaced. Code generated from the recompiler module 190 may be stored in a metadata file for processing by the virtual machine (VM) or the operating system.

Reflection calling reflection is performed where a dynamic instruction depends on one other dynamic instruction. In some embodiments, the first dynamic instruction is resolved, generating a new binary and then a second dynamic instruction, up to n instructions. Through reflection, methods can be invoked at runtime as long as the name and parameter types of the method are known. In some embodiments a threshold is defined, breaking infinite recursive cycles.

Thread interference occurs when more than one thread, executing simultaneously, access the same piece of data. When multiple threads have access to the same data set, the data may be corrupted. The versioned dependency graph (VDG) and super slice callgraph may indicate the threadbility of a group or list of instructions. The threading strategy derived from the versioned dependency graph enables parallelization of one or more disparate blocks of code.

Escape analysis is a technique that the analyzation module 182 may use to determine where in the program a pointer can be accessed. Escape analysis is performed through a combination of the versioned dependency graph (VDG) and super slice callgraph exploration to detect dependency relationships occurring simultaneously in more than one thread.

The above modules and their functions will be described in further detail in relation to an exemplary method below.

II. Exemplary Method

Figure 2A:
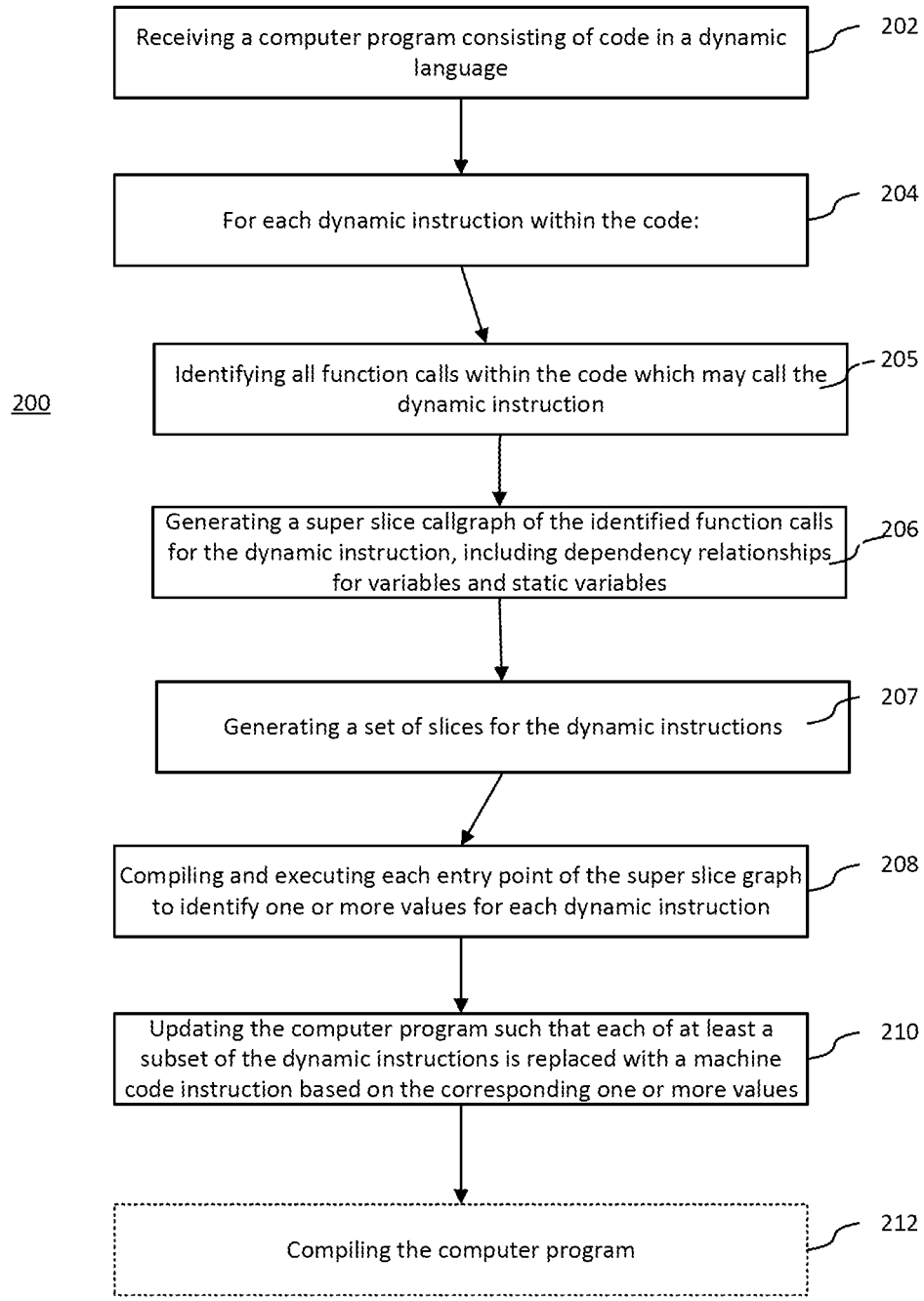
FIG. 2A is a flow chart illustrating an exemplary method that may be performed in some embodiments.

FIG. 2A is a flow chart illustrating an exemplary method that may be performed in some embodiments.

At step 202, the system receives a computer program consisting of code in a dynamic language. In some embodiments, a client device 120 sends a computer program in code form to one or more devices or systems configured to receive the computer program. In some embodiments, a user selects the computer program based on a prompt or request for the computer program within a user interface of the client device. Upon selecting the program, the computer program is sent to the optimization engine 102, which may be part of the client device 120 or part of some other device or system. In some embodiments, the computer program consists of code in a dynamic language, such as Python or any other suitable dynamic language. For example, "reflection" is a dynamic language feature within Java. The Java Reflection Application Programming Interface (API) allows programmers to dynamically inspect and interact with otherwise static language concepts such as classes, fields and methods, in order to, e.g., dynamically instantiate objects, set fields, invoke methods, and perform other suitable tasks within programming languages. In some examples, therefore, a user may choose an option to send a Java program containing dynamic reflection instructions to one or more elements of the system via a user interface on a client device. In some embodiments, upon the system receiving the program, a verification step is performed in order to verify that the program submitted contains one or more dynamic instructions.

At step 204, a number of following steps, particularly steps 205, 206, and 207, are performed for each dynamic instruction within the code of the received computer program. In some embodiments, the system locates and/or identifies all dynamic instructions within the code, then carries out the aforementioned steps for each of the dynamic instructions. In some embodiments, the system steps through each line of the program, and when it identifies a dynamic instruction within the program, it carries out the aforementioned steps. In various embodiments, a dynamic instruction can be identified by the system in a number of ways. For example, some dynamic instructions can be identified by the system based on a predefined list of dynamic instructions. Other dynamic instructions can be identified based on whether a returned value or state is predictable or determinable before the program is executed.

An example of a dynamic instruction within code is illustrated below:

```
def succ(y):
return lambda x: x+y
add5=succ(5)
print add5(3)
. . . 8
add1=succ(1)
print add1(3)
. . . 4
```

In the preceding code, "succ(y)" is a dynamic function which defines a way to build functions. Once defined, add5 can be defined using the dynamic function succ(y) by declaring that add5=succ(5). The call add5(3) thus returns 8 based on defining add5 through dynamic function succ(y).

At step 205, the system identifies all function calls within the code which may call the dynamic instruction. In terms of machine code, most dynamic instructions within a dynamic language program are called via function calls. In some embodiments, the system identifies function calls based on one or more predefined criteria. In some embodiments, the system identifies function calls by parsing based on the programming language.

At step 206, the system generates a super slice callgraph for the dynamic instruction. A super slice callgraph is a callgraph of function calls (e.g., all function calls for a given dynamic instruction) extended to include dependency relationships, for instance variables and static variables within time constraints. The dependency relationships may include read→write dependency relationships.

In some embodiments, super slice callgraphs represent the control flow of identified function calls for a given dynamic instruction, as well as the control flow of dependency relationships for instance variables and static variables within the given dynamic instruction, within time constraints. In some embodiments, the control flow of these dependency relationships may comprise or illustrate read-→write dependencies, how static variables or instance variables of a class are generated, or how data is stored within static variables or instance variables. In some embodiments, this accounts for call methods, updating static and instance variables, and/or updating field values of classes. In some embodiments, super slice callgraph module 154 generates the super slice callgraphs by first identifying all function calls within the received code, which may call the dynamic instruction. A super slice callgraph is then generated for all functions calls for that dynamic instruction as well as all dependency relationships for instance variables and static variables within time constraints.

In some embodiments, each node of the super slice callgraph represents a program path where, e.g., the identified function call may call the dynamic instruction and may depend on one or more static and/or instance variables which are created or updated within given time constraints. In this way, formal logic is used to build a control flow of the program and determine all possible paths.

In some embodiments, the super slice callgraphs may be considered "sub super slice callgraphs" of a larger overarching super slice callgraph which represents the program as a whole. In some embodiments, the overarching super slice callgraph represents a control flow of the program starting with a main path, then branching based on all methods being called and all functions being called (as well as all dependency relationships of static and instance variables being represented), down to all functions calling functions, until all path possibilities are exhausted. The sub super slice callgraphs are subsets of the overarching super slice callgraphs. Each sub super slice callgraph takes one method or function, represents the control flow of all the methods or functions calling that method or function, and so on until the root program ends. In some instances and embodiments, reflection calls another reflection, which will be further discussed below.

At step 207, the system generates a set of slices for a given dynamic instruction. In some embodiments, a certain N number of slices will be identified at the end of the control flow of the program, which is equal to the number of paths identified between the root of the program to the final leaves of each of the super slice callgraphs. Each slice represents one of the paths for the given dynamic instruction. In some embodiments, the system generates each slice by extracting the portion of the program which is represented by a particular generated super slice callgraph for a dynamic instruction and iterating until all the portions of the programs represented in the super slice callgraphs are extracted. As such, the system extracts slices which collectively yield all possible states, configurations, or values for the dynamic instructions. In some embodiments, extracting the slice involves generating a versioned dependency graph (VDG) for the dynamic instruction. The VDG represents a dependency path base. The system extracts one or more static instructions from the dynamic instruction based on the dependency path as represented by the VDG. Alternatively to generating a VDG, any other suitable method may be used which extracts the slice based on dependency paths for dynamic instructions. In some embodiments, extracting the static instructions involves resolving one or more pointers within the dynamic instruction; modifying one or more signatures of the dynamic instructions such that only primitive data types are passed into the dynamic instruction; replacing one or more dynamic libraries with one or more static libraries; and replacing one or more static variables within the dynamic instruction with values.

Each of the slices will have only one possible resolution or "state", although the slices can share a state. Each dynamic instruction has one or more possible states. For example, the "succ" dynamic instruction above has two possible states: 5 and 1. There are a finite number of states as long as the system determines the states to be enumerable. A dynamic instruction must have a state attached to it to be usable by the main program. In addition, a dynamic instruction with a state attached to it will be compilable in machine code. For many dynamic instructions, the system will be able to enumerate all the possible states, i.e., know what values are returned by the branching paths or slices. Dynamic code is limited to a number of potential cases; for example, the code of a dynamic language program can have, e.g., less than 1,024 possible states. In some cases, the dynamic instructions are such that the number of states is unenumerable. By executing a slice, in some situations, it is possible to determine a state that the slice ends up in, represented as the last value which will be generated at the end of a slice. By executing and determining such states, it is possible to optimize each slice. The preceding description of programs, slices, and states will inform the following steps in relation to optimizing slices.

In some embodiments, the system synthesizes each slice based on following the control flow path in the generated VDG. In some embodiments, this process includes the system selecting all the call stacks and executing them to generate a new program out of them. In some embodiments, the system synthesizes the slice in order to rebuild the offsets of all addresses, as the offsets have changed. In some embodiments, the system synthesizes the slice such that the fewest number of instructions possible are changed. In some embodiments in which slices are synthesized, executing the slices in step 208 involves an additional step of executing all synthesized slices in the same execution pass.

At step 208, the system compiles and executes each entry point of the super slice graph to identify one or more values for each dynamic instruction. In some embodiments, the system performs this step by compiling and executing each of the generated slices for the dynamic instruction and receiving one or more values (i.e., resulting states) at the end of each executed slice. In some embodiments, the slices are compiled and approximately executed using a machine (e.g., a virtual machine) capable of compiling and approximating execution of dynamic language code. In some embodiments, the slices are compiled and executed or approximately executed using a real computer or a virtual machine (VM). In instances where approximate execution is performed, the instruction is not executed, but rather than approximation of the instruction which involves less data processing. This is possible because the system only executes the instructions to generate results based on some relevant properties for that slice. In some embodiments, a compiler using one or more optimization techniques to replace the dynamic instruction with a static instruction is employed. In some embodiments, compiling and approximating execution of the slices is performed with a dynamic-compilation-based machine, while compiling the computer program is performed with a static-compilation-based machine.

In some embodiments, upon execution of the slices, two results are possible. A first result is the state(s) of the dynamic instruction. A second result is notification of a crash or unresponsive program due to a delay in execution or taking too long to execute. In some embodiments, this may be the result of a dynamic instruction failure to execute or exceeding a time threshold for execution. If the second result occurs, the system determines that the instruction is not "compilable" due to the number of states either being too large or enumerable such that optimization and compilation are not possible or desirable within the boundaries of the system. In some embodiments, determining that the dynamic instructions are not compilable or optimizable is based on the number of states returning values not being estimable or quantifiable beyond a predefined threshold. In an example case where the input of a function depends on an external value such as a user-submitted string value in a text field, and the input from the user is necessary to generate the function, it is impossible for the system to predict what will happen and thereby enumerate the states possible. In this instance, determining the number of states is an undecidable problem. In most situations, such "unsolvable" cases are relatively rare compared to the solvable cases. The result is that the program cannot be optimized, even though the program as a whole will still work as expected. Otherwise, determining all the reachable states of a dynamic instruction will allow the system to compile it to machine code for a specific architecture.

For example, the slices for the "succ" dynamic instruction above can be executed in a python interpreter. The states are determined to be 1 and 5. Compiling the program, the system creates the two static functions add(1) and add(5), directly removing the lambda calls and the succ dynamic function. The resulting substitution for the code in the example above would be:
add1: return x+1
add5: return x+5

At step 210, the system updates the computer program such that each of at least a subset of the dynamic instructions is replaced with machine code instructions based on the corresponding values. In some embodiments, a dynamic instruction is replaced with its one or more values in the initial slice using well known compiler techniques. Techniques which can be used can include, for example, Just-In-Time (JIT) techniques to keep lines of machine code in memory and reuse them; interpreter techniques to general lines of machine code for each line of interpreted program; JIT tracing techniques wherein JIT is optimized with better performance based on current program use; or any other suitable runtime optimizations. In some embodiments, one or more reflection instructions are replaced with static instructions. In some embodiments, during the execution of the slices in step 208, new information is received from the system which is used to execute the next instruction. This results in optimizations while updating the computer program. In some embodiments, simple optimizations can be achieved by substituting static instructions related to data structures and other elements of object-oriented programming. For example, a.getName( ) would get converted into a String if "a" is always of the String type during runtime. In some embodiments, the computer program includes self-modifying code, such that upon compilation and execution, the code is configured to modify itself to be optimized further. Such self-modification techniques can include, e.g., one or more of the aforementioned optimization techniques.

At step 212, in some embodiments, the system compiles the computer program. In some embodiments, during the compilation, the compiler techniques described in step 210 are applied. In some embodiments, the updated computer program is stored in one or more databases, e.g., the compiled program database 136. In some embodiments, upon compiling the program, the updated computer program is sent to one or more devices or systems, such as, e.g., the client device 120.

In some embodiments, the system displays one or more output elements within a user interface of client device 120 or some other device or system. Displayed elements may include, for example, the optimized code within the computer program after modifications, information about the optimizations performed, one or more super slice callgraphs or sub-super slice callgraphs, an environment to perform further approximation of executions of the computer program, one or more metrics (e.g., number of dynamic instructions in the computer program, number of dynamic instructions replaced with static instructions, number of total optimizations performed, estimated, approximated, or actual compilation and/or execution time), or any other suitable elements related to the systems and methods herein.

Figure 2B:
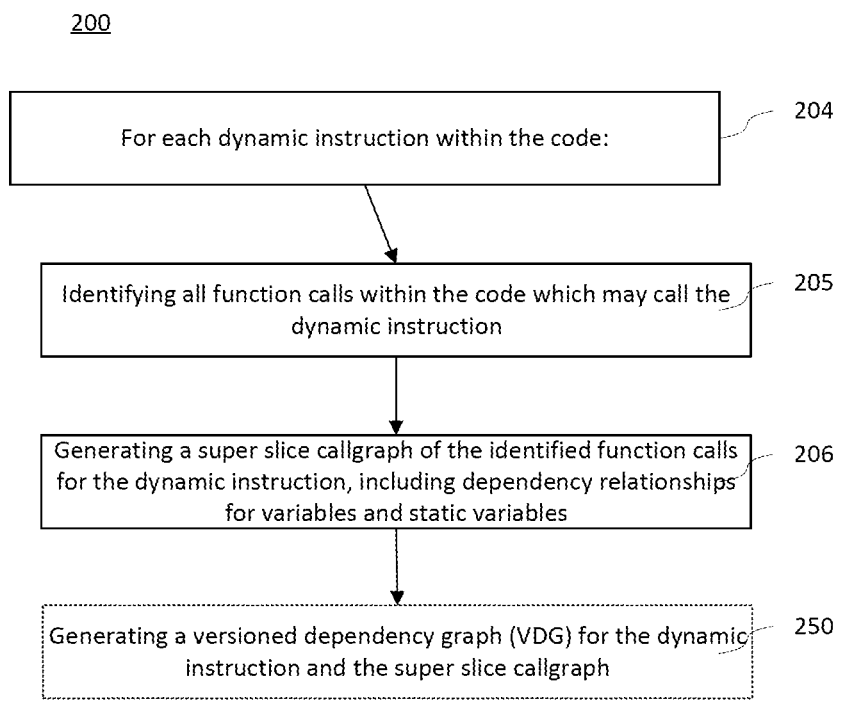
FIG. 2B is a flow chart illustrating additional steps that may be performed in accordance with some embodiments.

FIG. 2B is a flow chart illustrating additional steps that may be performed in accordance with some embodiments. Steps 204, 205, and 206 are as described in FIG. 2A. During generation of the slice at Step 206, in some embodiments, additional steps may be performed.

At optional step 250, the system generates a versioned dependency graph (VDG) for the dynamic instruction and the super slice callgraph, as described in FIG. 2A above.

Figure 3A:
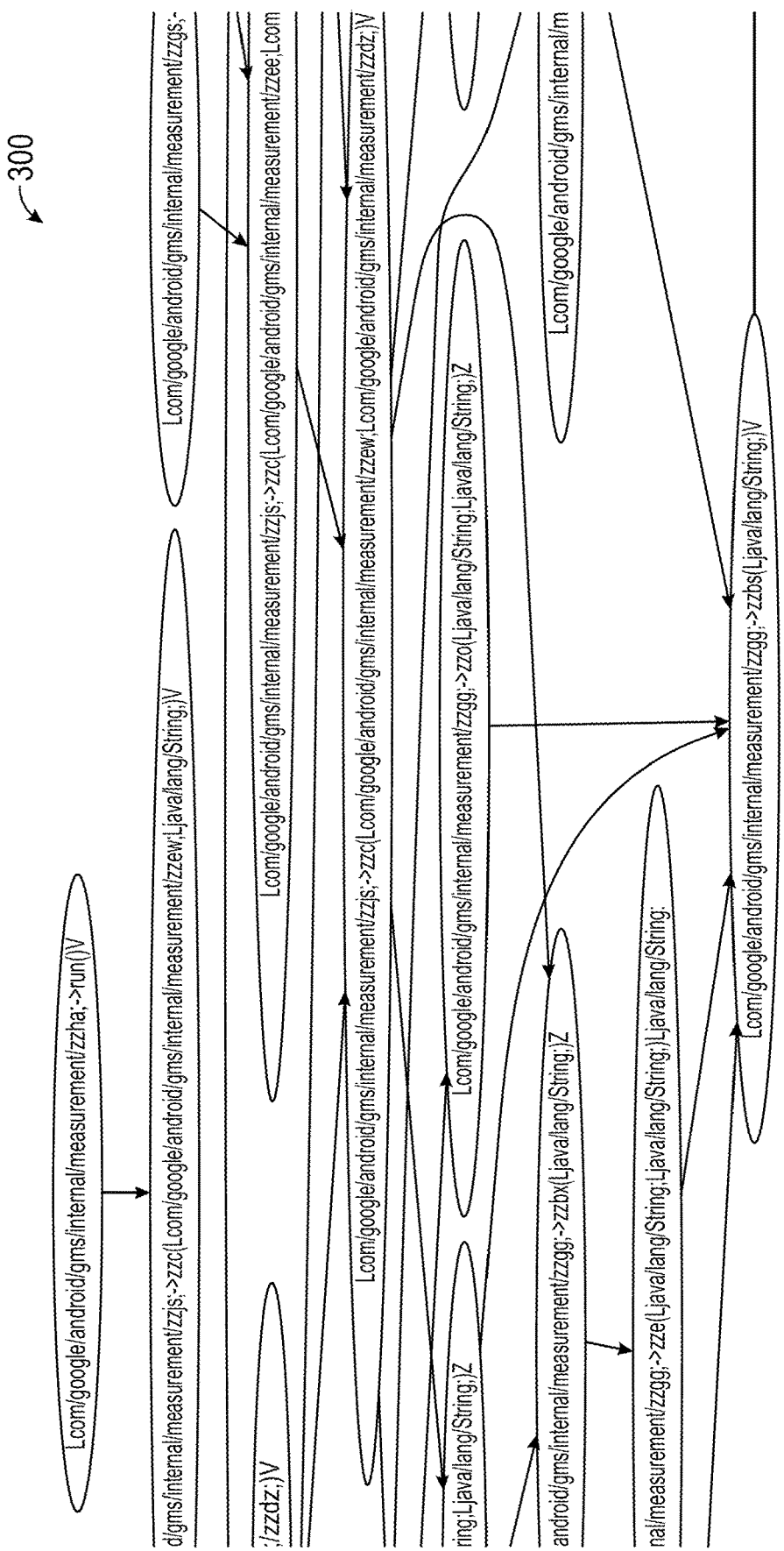
FIG. 3A is a diagram illustrating one example embodiment 300 of a generated super slice callgraph for a computer program, in accordance with some embodiments.

FIG. 3A is a diagram illustrating one example embodiment 300 of a generated super slice callgraph for a computer program, in accordance with some embodiments. The diagram shows a subset of a super slice callgraph which is generated for the computer program, in order to illustrate the control flow of the computer program along multiple possible branching paths. Each branch of the super slice callgraph represents one method, and each of the branching paths represents a method which is calling that method. These paths continue until the "root" of the program, i.e., no more methods are being called and the existing methods have terminated. The example illustrates that a typical computer program, especially one with dynamic instructions, can become very complicated quickly. Typically, such super slice callgraphs can contain thousands or even millions of nodes representing function calls and possible branching paths.

Figure 3B:
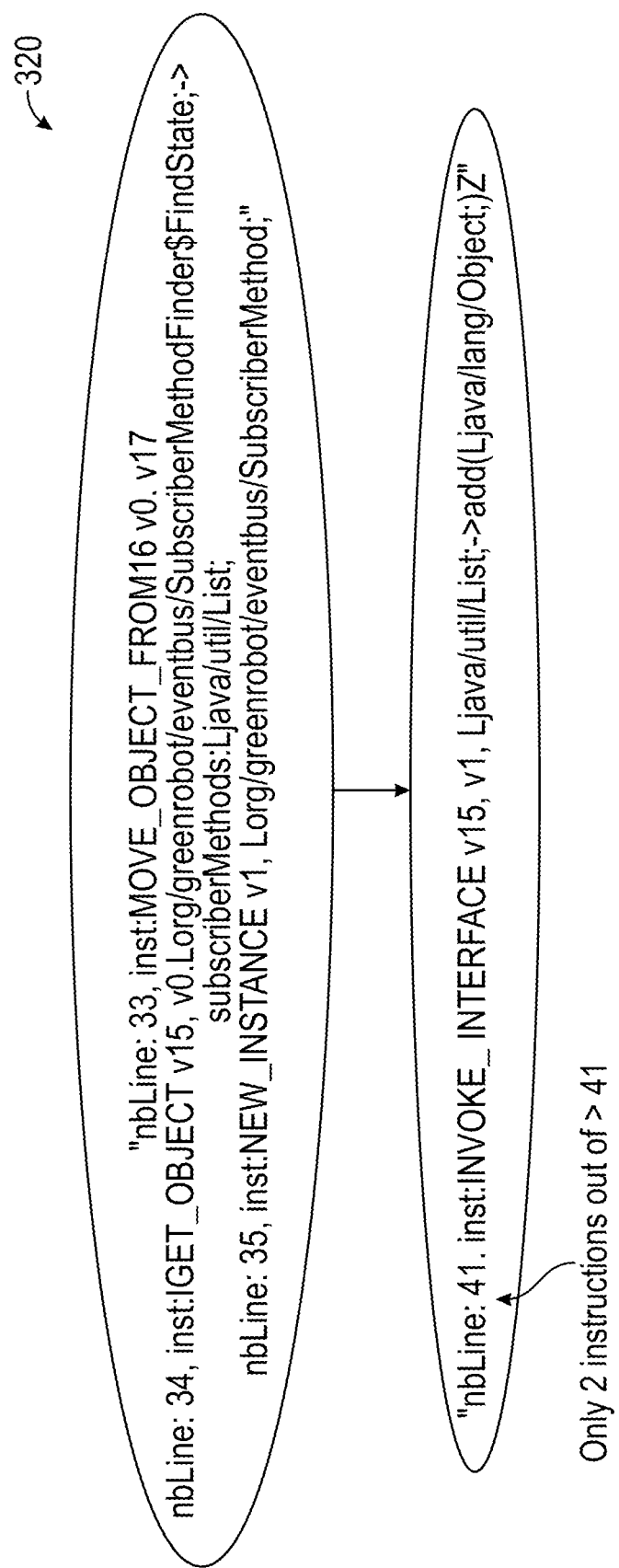
FIG. 3B is a diagram illustrating one example embodiment 320 of a generated slice for a static instruction, in accordance with some embodiments.

FIG. 3B is a diagram illustrating one example embodiment 320 of a generated slice for a static instruction, in accordance with some embodiments. The slice generated in the example returns the reflection value upon execution, or approximated execution, of the slice. The slice includes staticized instructions which the system has inserted as a replacement for one or more of the dynamic instruction(s) which were illustrated in FIG. 3A. The super slice callgraph gives you all possible values of the seed (i.e. the target dynamic instruction) of the larger program, with staticized instructions to be substituted. If the system executes a specific instruction, it must go to a single program and execute the method calling that program. Typically in a dynamic program, the process becomes more complicated, since most of the instructions of the method have nothing to do with the instruction the system is executing. If static instructions are substituted within a slice, however, then there is no need to execute methods from the rest of the program, which simplifies the program significantly. Thus, only 2 instructions out of over 41 need to be called in this slice, allowing for significant optimizations of the code.

Figure 3C:
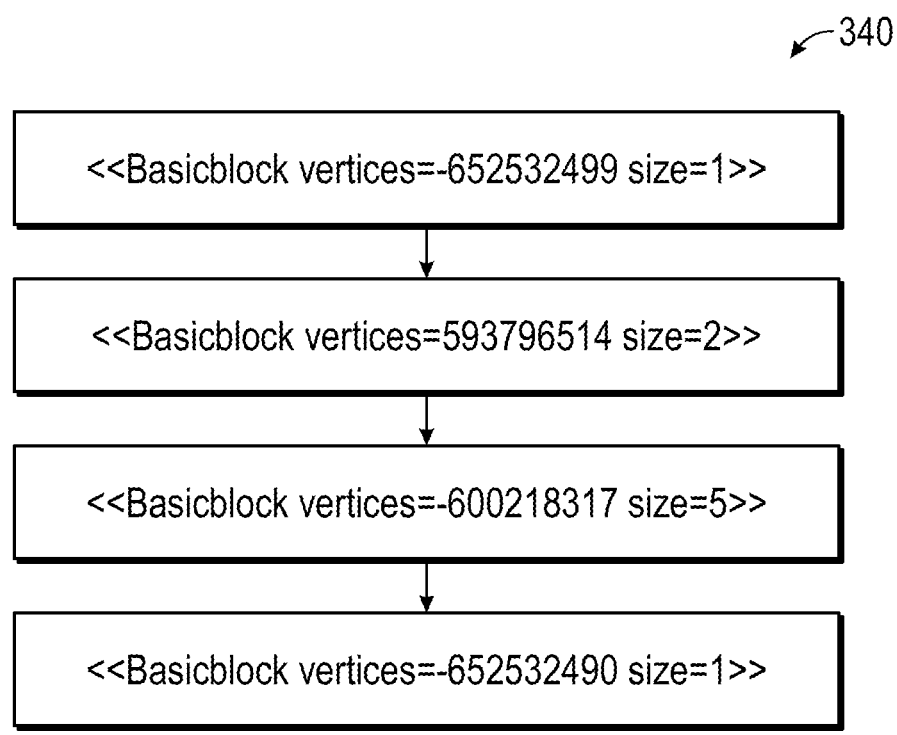
FIG. 3C is a diagram illustrating one example embodiment 300 of executing a compiled program, in accordance with some embodiments.

FIG. 3C is a diagram illustrating one example embodiment 340 of executing a compiled program, in accordance with some embodiments. The diagram illustrates a debug system during runtime execution of a compiled program at the end of the steps from FIG. 2A. In the compiled and optimized program, only a few instructions remain, and each instruction is much simpler than the previous dynamic instruction. A given pointer to a function will typically perform the same process most of the time from one execution to the next, for example, and a given variable will typically not change its underlying data structure most of the time. For example, it is very uncommon for an integer to be converted into a string, and the cases in which it will happen can be detected. Therefore, the program is simplified and optimized in this way. Thus, as illustrated, the current state of the Basic Blocks in terms of vertices and size changes in a predictable and static way in the compiled program, leading to a more efficient and optimized program which is capable of being compiled and executed much faster than the equivalent dynamic program would be.

Figure 4:
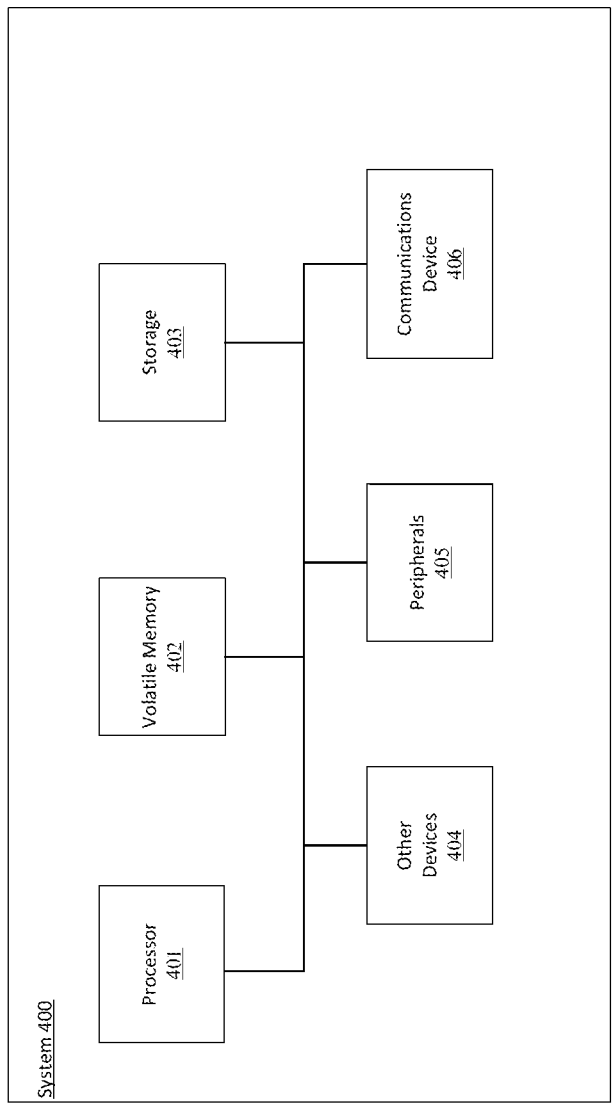
FIG. 4 is a diagram illustrating an exemplary computer that may perform processing in some embodiments.

FIG. 4 is a diagram illustrating an exemplary computer that may perform processing in some embodiments. Exemplary computer 400 may perform operations consistent with some embodiments. The architecture of computer 400 is exemplary. Computers can be implemented in a variety of other ways. A wide variety of computers can be used in accordance with the embodiments herein.

Processor 401 may perform computing functions such as running computer programs. The volatile memory 402 may provide temporary storage of data for the processor 401. RAM is one kind of volatile memory. Volatile memory typically requires power to maintain its stored information. Storage 403 provides computer storage for data, instructions, and/or arbitrary information. Non-volatile memory, which can preserve data even when not powered and including disks and flash memory, is an example of storage. Storage 403 may be organized as a file system, database, or in other ways. Data, instructions, and information may be loaded from storage 403 into volatile memory 402 for processing by the processor 401.

The computer 400 may include peripherals 405. Peripherals 405 may include input peripherals such as a keyboard, mouse, trackball, video camera, microphone, and other input devices. Peripherals 405 may also include output devices such as a display. Peripherals 405 may include removable media devices such as, e.g., hard drives, solid-state drives, or flash drives. Communications device 406 may connect the computer 100 to an external medium. For example, communications device 406 may take the form of a network adapter that provides communications to a network. A computer 400 may also include a variety of other devices 404. The various components of the computer 400 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for generating compilable code for a computer program from dynamic language code, comprising:
   receiving a computer program comprising code in a dynamic language, wherein the code comprises a plurality of dynamic instructions;
   for each dynamic instruction within the code:
      identifying all function calls within the code which call the dynamic instruction;
      generating a super slice callgraph for the identified function calls, wherein the super slice callgraph is a callgraph of the identified function calls extended to include dependency relationships comprising variables and static variables within time constraints;
      generating a set of slices for the dynamic instruction;
      extracting the set of slices for the dynamic instruction, wherein extracting the set of slices comprises:
         generating a versioned dependency graph (VDG) for the dynamic instruction and the super slice callgraph, wherein the VDG represents a dependency path based on a plurality of dependencies for the dynamic instruction; and
         synthesizing each slice based on the dependency path in the generated VDGs, wherein executing the slice comprises executing all synthesized slices in the same execution pass;
   compiling and executing each super slice callgraph to identify one or more values for each dynamic instruction; and
   updating the computer program such that each of at least a subset of the dynamic instructions is replaced with machine code instructions based on the corresponding values.

2. The method of claim 1, wherein the plurality of dynamic instructions comprises at least one or more dynamically called methods, one or more dynamically called functions, or a combination thereof.

3. The method of claim 1, wherein compilation and approximate execution of each slice is performed with a dynamic-compilation-based machine.

4. The method of claim 1, wherein compiling and executing each slice to identify one or more values for each dynamic instruction comprises:
concurrent to executing the slice:
   receiving and identifying one or more values for each dynamic instruction.

5. The method of claim 4, further comprising:
determining that one or more dynamic instructions are not compilable and not optimizable based on the slice for a dynamic instruction failing to execute or exceeding a time threshold for execution.

6. The method of claim 4, further comprising:
determining that one or more dynamic instructions are not compilable and not optimizable based on the number of values for the one or more dynamic instructions not being estimable or quantifiable beyond a predefined threshold.

7. The method of claim 1, wherein updating the computer program comprises replacing one or more reflection instructions.

8. The method of claim 1, wherein compiling the computer program comprises additionally optimizing the computer program based on one or more compiler optimization techniques.

9. The method of claim 1, wherein the computer program comprises one or more elements of self-modifying code.

10. A non-transitory computer-readable medium containing instructions for generating compilable code for a computer program from dynamic language code, comprising:
   instructions for receiving a computer program comprising code in a dynamic language, wherein the code comprises a plurality of dynamic instructions;
   for each dynamic instruction within the code:
      instructions for identifying all function calls within the code which call the dynamic instruction;
      instructions for generating a super slice callgraph for the identified function calls, wherein the super slice callgraph is a callgraph of the identified function calls extended to include dependency relationships comprising variables and static variables within time constraints; and
      instructions for generating a set of slices for the dynamic instruction;
   instructions for extracting the set of slices for the dynamic instruction, wherein extracting the set of slices comprises:
      instructions for generating a versioned dependency graph (VDG) for the dynamic instruction and the super slice callgraph, wherein the VDG represents a dependency path based on a plurality of dependencies for the dynamic instruction; and
      instructions for synthesizing each slice based on the dependency path in the generated VDGs, wherein executing the slice comprises executing all synthesized slices in the same execution pass;
   instructions for compiling and executing each slice to identify one or more values for each dynamic instruction; and
   instructions for updating the computer program such that each of at least a subset of the dynamic instructions is replaced with machine code instructions based on the corresponding values.

11. The non-transitory computer-readable medium of claim 10, wherein the plurality of dynamic instructions comprises at least one or more dynamically called methods, one or more dynamically called functions, or a combination thereof.

12. The non-transitory computer-readable medium of claim 10, wherein compilation and approximate execution of each slice is performed with a dynamic-compilation-based machine.

13. The non-transitory computer-readable medium of claim 10, wherein compiling and executing each slice to identify one or more values for each dynamic instruction comprises:

concurrent to executing the slice:

instructions for receiving and identifying one or more values for each dynamic instruction.

14. The non-transitory computer-readable medium of claim 10, wherein compiling the computer program comprises additionally optimizing the computer program based on one or more compiler optimization techniques.

15. The non-transitory computer-readable medium of claim 10, wherein updating the computer program comprises replacing one or more reflection instructions.

16. The non-transitory computer-readable medium of claim 10, wherein the computer program comprises one or more elements of self-modifying code.

\* \* \* \* \*